Figure 1:
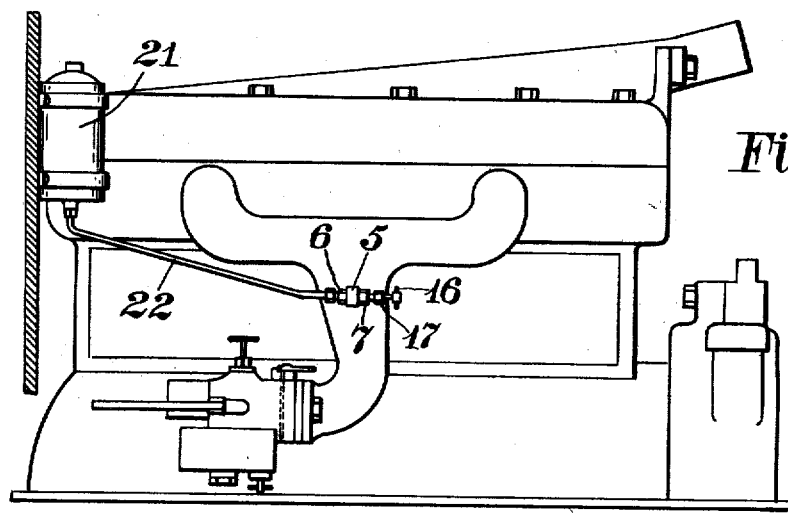

Sept. 4, 1923.

E. O. STERNS 1,466,857

SYSTEM OF LUBRICATING GAS ENGINES

Filed Sept. 13, 1921

Inventor

Edward O. Sterns by Lincoln & Lincoln
his Attorneys

Patented Sept. 4, 1923.

1,466,857

UNITED STATES PATENT OFFICE.

EDWARD O. STERNS, OF COLUMBUS, OHIO, ASSIGNOR TO THE STERNS GAS ENGINE LUBRICATOR COMPANY, OF COLUMBUS, OHIO, A CORPORATION OF OHIO.

SYSTEM OF LUBRICATING GAS ENGINES.

Application filed September 13, 1921. Serial No. 500,365.

*To all whom it may concern:*

Be it known that I, EDWARD O. STERNS, a citizen of the United States, residing at Columbus, in the county of Franklin and State of Ohio, have invented a certain new and useful Improvement in Systems of Lubricating Gas Engines, of which the following is a specification.

My invention relates to a system of lubrication and is particularly designed to provide for the lubrication of the combustion chamber and such parts as are immediately adjacent thereto, as for instance, the cylinder walls, valves, valve stems and wrist pins as well as many of the operative parts in the crank case of the engine.

My invention has for its object the providing of a system which is entirely automatic in its operation and thoroughly dependable.

A further object of the invention is to provide means in connection with the lubricating system whereby the vacuum caused by the piston displacement within the cylinder will regulate and control the quantity of lubricant supplied to the combustion chamber.

These and other objects will be apparent from the following specifications taken in connection with the annexed drawings.

With the above objects in view my invention consists in providing a lubricating system wherein there is a proper lubricant reservoir or other source, a conduit leading from said source to the combustion chamber of an internal combustion engine, and means within said conduit operable by the vacuum created by the piston displacement within said chamber for regulating and controlling the quantity of lubricant supplied therethrough.

The invention further consists in parts and combination of parts, all of which will be hereinafter more fully set forth and claimed.

It is a well known fact that in internal combustion engines a vacuum is created by the piston displacement within the cylinder and that this vacuum is employed to convey the gas to the combustion chamber, and that a valve, commonly known as a "butter-fly" is located between the gas producing device (carburetor) and the combustion chamber for regulating the supply of gas thereto. This construction causes a greater density of vacuum when the gas supply is diminished and the engine running slow and a less density when the gas supply is increased and the engine running fast. Hence it will be readily realized that as the engine is run fast a greater amount of lubricant is required and a decreased vacuum pull must of necessity provide a greater lubricant supply, while the slow running of the engine requires that less lubricant be supplied and the consequent increased vacuum pull must decrease the quantity of lubricant, and finally the stopping of the engine must also stop the supply of lubricant entirely.

With the above in mind I have devised my lubricating system as described in the following specification.

In the drawings Fig. 1 is a side elevation of an ordinary internal combustion engine showing how I prefer to adapt my invention thereto.

Figure 2:
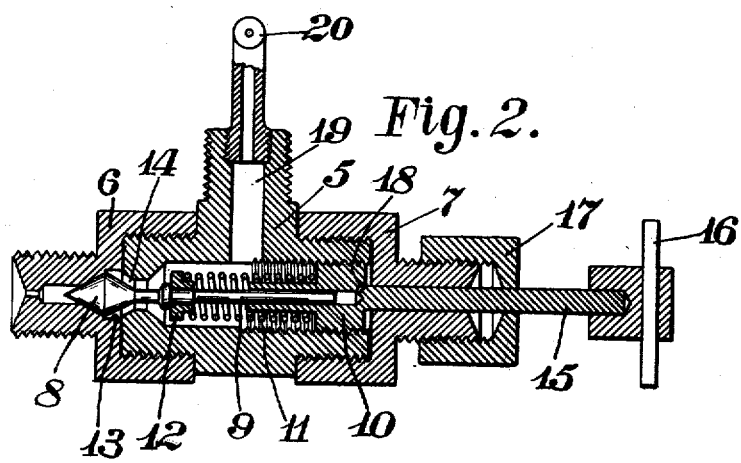
Figure 3:
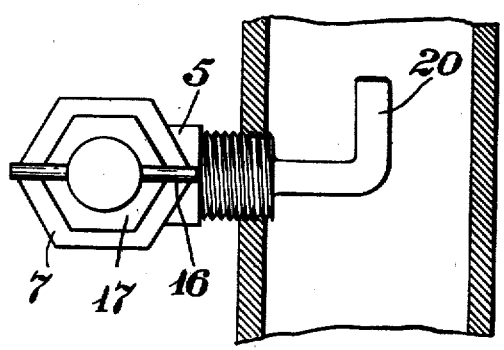

Fig. 2 is a horizontal section of a valve construction employed for carrying out my invention, and Fig. 3 is a right hand end view of the valve showing how the same is attached to the intake manifold of an engine.

5 designates the main casing of the valve, said casing being externally threaded at its ends to receive centrally perforated caps 6 and 7. The main casing contains the valve 8 of double cone form and having a stem 9 sliding in a centrally bored nut 10 threaded to the interior of the casing. The valve is provided with a spring 11 seated at one end on the nut 10 and pressing at its other end against a collar 12 on the valve stem. The cap 6 is provided with a recess at 13 of slightly larger diameter than the valve and the bottom of said recess is provided with a seat for the valve so that when the valve is seated thereon the passage through the cap is closed. The passage at that end of the casing covered by the cap 6 is beveled out or enlarged as shown at 14 so that the valve has room for movement and so that the size of the passage for lubricant around the valve varies according to the position of the valve, said passage growing smaller as the valve is moved toward the main casing.

The nut 10 has a stem 15 extending through the perforation of the cap 7, said stem being provided with a handle 16 by means of which the nut may be turned to vary the pressure of the spring on the valve. The stem 15 can be provided with a packing nut 17. At 18 is a vent to make easy the movement of the nut and valve stem.

The main casing has a chambered lateral extension 19, threaded to engage a tapping in the neck of the manifold of the engine and said lateral extension 19 is equipped with an angled nozzle 20 opening upwardly and centrally in the neck of the manifold, see Fig. 3, so that lubricant may be sucked up from the main valve chamber into the manifold and cylinders.

21 designates an oil reservoir mounted on the dash, said reservoir being provided with a pipe 22 connected with the cap 6.

When the engine is idle the cone valve 8 is normally seated in the cap 6, thus entirely closing off the lubricant supply but as soon as the engine is started the vacuum created as above set forth causes the valve 8 to move against the pressure of the spring 11. If the engine is raced at starting a light vacuum pull is created and oil flows freely around the cone valve 8, past the openings 13 and 14 and carried by such pull through the intake manifold and into the combustion chamber of the engine but as soon as the engine is throttled the greater vacuum pull causes the valve 8 to diminish the space 14 between it and the tapered opening in the end of the main casing 5 thereby diminishing the supply of lubricant, in accordance to the amount of throttling and vacuum pull. When the engine is stopped and no vacuum present then the spring 11 forces the valve 8 into its normal position and the lubricant supply is again shut off.

From the above it will be seen that a perfect control can be maintained after preliminary adjustments have been made by means of the nut 10 and its coacting parts.

While I have set forth in detail a structure designed to carry out my invention I do not wish to be limited thereto except in so far as the annexed claims shall limit me as modifications may be made in the details of construction without departing from my invention.

Having thus described my invention, what I wish to claim is:

1. In a system of lubrication the combination with an internal explosive engine creating a vacuum by the piston displacement thereof, of a lubricant supply source, a conduit leading therefrom to the explosive chamber of said engine, and a valve located in said conduit, said valve being operable by said vacuum and adapted to control and regulate the supply of lubricant to said combustion chamber and permitting suction created by said vacuum to convey the lubricant to said combustion chamber.

2. In a system of lubrication the combination with an internal explosive engine creating a vacuum by the piston displacement thereof, of a lubricant supply source, a conduit leading therefrom to the explosive chamber of said engine and a valve located in said conduit operable by said vacuum for controlling the supply of lubricant passing therethrough in proportion to the speed of the engine and for preventing the passing of lubricant therethrough when said engine is idle.

3. In a system of lubrication the combination with an internal explosive engine creating a vacuum by the piston displacement thereof, of a lubricant supply source, a conduit leading therefrom to the explosive chamber of said engine, a valve located in said conduit operable by said vacuum for controlling and regulating the supply of lubricant to said combustion chamber and means for predetermining the quantity of lubricant allowed to pass therethrough.

4. In a system of lubrication the combination with an internal explosive engine creating a vacuum by the piston displacement thereof of a lubricant supply source, a conduit leading therefrom to the explosive chamber of said engine and a valve located in said conduit operable by said vacuum for controlling the supply of lubricant passing therethrough in proportion to the speed of the engine and for preventing the passing of lubricant therethrough when said engine is idle and means for predetermining the quantity of lubricant allowed to pass therethrough.

EDWARD O. STERNS.